United States Patent
Watanabe et al.

(10) Patent No.: US 7,366,619 B2
(45) Date of Patent: Apr. 29, 2008

(54) SIGNAL-PROCESSING UNIT FOR FLUXGATE MAGNETOMETERS

(75) Inventors: Takamoto Watanabe, Nagoya (JP); Sumio Masuda, Tokyo (JP)

(73) Assignees: DENSO CORPORATION, Kariya (JP); Jeco Co., Ltd., Saitama-pref. (JP)

( * ) Notice: Subject to any disclaimer, the term of this patent is extended or adjusted under 35 U.S.C. 154(b) by 93 days.

(21) Appl. No.: 11/501,918

(22) Filed: Aug. 10, 2006

(65) Prior Publication Data
US 2007/0203666 A1 Aug. 30, 2007

(30) Foreign Application Priority Data
Feb. 27, 2006 (JP) .............. 2006-050301

(51) Int. Cl.
G01B 5/28 (2006.01)
G01R 33/04 (2006.01)

(52) U.S. Cl. ..................... 702/35; 324/247
(58) Field of Classification Search ............ 702/35; 324/247, 254, 253; 33/361
See application file for complete search history.

(56) References Cited

U.S. PATENT DOCUMENTS

| 3,800,213 A | * | 3/1974 | Rorden ............ 324/247 |
| 4,277,751 A | * | 7/1981 | Lawson et al. ........ 324/254 |
| 4,590,679 A | * | 5/1986 | Livings et al. ........ 33/361 |
| 5,270,648 A | * | 12/1993 | Watson ............ 324/253 |
| 2005/0047526 A1 | | 3/2005 | Watanabe et al. | |

FOREIGN PATENT DOCUMENTS

JP 2005-102129 4/2005

OTHER PUBLICATIONS

"Fluxgate Magnetometers for Outer Planets Exploration" by M. H. Acuna; IEEE Transactions On Magnetics, vol. 10; 1974; pp. 519-523 (discussed on p. 6 in the spec.).
"Small Size Magnetic Field Sensor" by Makoto Kawakami et al.; Technical Publication of *Sumitomo Tokushu Kinzoku*, vol. 14; Mar. 2003; pp. 109-112 (discussed on p. 6 in the spec.).
"Integrated Driving and Readout Circuits for Orthogonal Fluxgate Sensor" by Xinbo Qian et al.; IEEE Transactions On Magnetics, vol. 41, No. 10; Oct. 2005; pp. 3715-3717 (discussed on p. 6 in the spec.).
"Symmetric Response Obtained With an Orthogonal Fluxgate Operating in Fundamental Mode" by Ichiro Sasada: IEEE Transactions On Magnetics, vol. 38, No. 5; Sep. 2002; pp. 3377-3379 (discussed on p. 6 in the spec.).

* cited by examiner

*Primary Examiner*—John Barlow
*Assistant Examiner*—Victor J. Taylor
(74) *Attorney, Agent, or Firm*—Posz Law Group, PLC

(57) ABSTRACT

A signal processing unit includes an integrating unit. The integrating unit is composed of a plurality of digital elements and is operative to integrate a detection signal over every quarter of one cycle of the detection signal to generate an integration value. The integration values to be generated are represented as S1, S2, S3, and S4. A calculating unit includes a plurality of digital elements and performs addition and subtraction on the generated integration values in accordance with the following equations used to calculate an in-phase component and a quadrature-phase component of (Ip=S4p−3+S4p−2−S4p−1−S4p) and (Qp=S4.4−S4p−−S4p−1+S4p). Where Ip represents the in-phase component and Qp represents the quadrature-phase component. An amplitude obtaining unit obtains an amplitude of the detection signal based on the in-phase component and the quadrature-phase component.

6 Claims, 10 Drawing Sheets

SIGNAL-PROCESSING UNIT FOR FLUXGATE MAGNETOMETERS

CROSS REFERENCE TO RELATED APPLICATIONS

This application is based on Japanese Patent Application 2006-050301 filed on Feb. 27, 2006. This application claims the benefit of priority from the Japanese Patent Application, so that the descriptions of which are all incorporated herein by reference.

FIELD OF THE INVENTION

The present invention relates to signal-processing units, which are designed to process signals sensed by a fluxgate magnetometer.

BACKGROUND OF THE INVENTION

As highly-sensitive field sensors, fluxgate magnetometers (fluxgate sensors) are conventionally known. Such a fluxgate magnetometer is designed to sense, based on nonlinearity of a magnetization curve of a magnetic substance, the magnitude of a magnetic field to be measured; this magnetic substance is excited by an alternating magnetic field on which the magnetic field has been superimposed.

FIG. 10 illustrates the schematic configuration of a fluxgate magnetometer 10 having two orthogonal sensing axes and that of a signal-processing unit 100 operative to process detection signals output from the fluxgate magnetometer 10.

The fluxgate magnetometer 10 is provided with a ring core 11 made of a given magnet substance, a drive control winding 12 wound around the entire circumference of the core 11, and first and second sense windings 13 and 14 diametrically wound around the core such that they are orthogonal to each other and to the center axis of the core 11. The sensor construction of the fluxgate magnetometer 10 provides the two sensing axes.

Note that, in FIG. 10, illustrative representation of part of the second sense winding 14 is omitted to simply show the configuration of the fluxgate magnetometer 10. The sensing axis corresponding to the first sense winding 13 (top and bottom direction in FIG. 10) will be referred to as X axis, and that corresponding to the second sense winding 14 (right and left direction in FIG. 10) will be referred to as Y axis.

Excitation signals, such as excitation voltages, $v_{d1}$ and $vd_{d2}$ respectively having complementary waveforms and each having a previously set drive frequency $f_d$ are configured to be applied to the drive control winding 12 via resistors R1 and R2 connected to both ends thereof. To the respective first and second sense windings 13 and 14, bias voltage $V_{BIAS}$ is configured to be applied.

To the first sense winding 13, a resistor $R_x$ and a capacitor $C_x$ constituting a resonant circuit 15 together with the first sense winding 13 are connected. Similarly, to the second sense winding 14, a resistor $R_y$ and a capacitor $C_y$ constituting a resonant circuit 16 together with the second sense winding 14 are connected. The resistors $R_x$ and $R_y$ serve as limiting elements respectively to limit the Q factors of the resonant circuits 15 and 16.

The resonant circuits 15 and 16 are designed to resonate at a carrier frequency $f_c$ double of the drive frequency $f_d$ so that the first and second sense windings 13 and 14 are designed to detect signals (detection signals) $v_{ox}$ and $v_{oy}$ each having the carrier frequency $f_c$.

In the fluxgate magnetometer 10 with the configuration set forth above, application of the excitation signals $v_{d1}$ and $v_{d2}$ to the drive control winding 12 allows an alternating current with the drive frequency $f_d$ to flow through the drive control winding 12. The flow of the alternating current through the drive control winding 12 generates an alternating magnetic field with the drive frequency $f_d$ in the core 11 along the circumferential direction thereof.

When there is no target magnetic field with an X-axis component and a Y-axis component, the magnetic fields in the two portions of the core 11 at which the first sense winding 13 is wound are cancelled to each other. Similarly, the magnetic fields in the two portions of the core 11 at which the second sense winding 14 is wound are cancelled to each other.

This allows the magnetic flux linkages across the first and second sense windings 13 and 14 to be substantially zero, so that the amplitudes of the detection signals $v_{ox}$ and $v_{oy}$ are substantially zero.

In contrast, when there is a target magnetic field with an X-axis component and a Y-axis component, the magnetic fields in the two portions of the core 11 at which the first sense winding 13 is wound are unbalanced. Similarly, the magnetic fields in the two portions of the core 11 at which the second sense winding 14 is wound are also unbalanced.

The unbalance of the magnetic field in the core 11 causes signal components to be induced in the first and second sense windings 13 and 14. The nonlinearity of the magnetization curve of the core 11 causes the induced signal components to have the carrier frequency $f_c$ double of the drive frequency $f_d$.

The filtering functions of the resonant circuits 15 and 16 allow the signal components each with the carrier frequency $f_c$ to be sampled as the detection signals $v_{OX}$ and $v_{OY}$. The amplitudes of the detection signals $v_{ox}$ and $v_{oy}$ represent the magnitudes of the X-axis and Y-axis components of the target magnetic field.

Note that the resonant circuits 15 and 16 practically cannot eliminate all components with frequencies except for the carrier frequency $f_c$. As illustrated in FIG. 11, therefore, noise components each with a frequency substantially equal to the drive frequency $f_d$ ($=f_c/2$) appear. The noise components become strongly apparent relatively when there is no target magnet field (see the waveform of the detection signal $v_{ox}$ in the case where there is no target magnetic field $H_x$, such as $H_x$ is zero, in FIG. 11). The noise components are normally superimposed on the detection signals independently of the magnitudes of the X and Y-axis components of the target magnetic field.

Note that the detection signals $v_{ox}$ and $v_{oy}$ obtained by the fluxgate magnetometer 10 can be regarded as signals obtained by performing amplitude modulation on a carrier wave with the carrier frequency $f_c$ based on the target magnet field as an original modulating signal (original baseband signal). For this reason, demodulation of the detection signals $v_{ox}$ and $v_{oy}$ allows a signal indicative of the target magnetic field to be sampled.

The detection signals $v_{ox}$ and $v_{oy}$ are normally subjected to digital processing. For example, in direction sensors for producing a direction signal indicative of a direction based on the detection signals $v_{ox}$ and $v_{oy}$ obtained by sensing the earth's magnetic field, direction obtaining operation and/or magnetizing correction, which are difficult to be carried out by analog circuits, have been performed by digital processing.

The signal-processing unit 100 operative to manipulate the detection signals output from the fluxgate sensor 10 is therefore provided with an X-axis processor 110 and a Y-axis processor 120 that demodulate the detection signals $v_{OX}$ and $v_{OY}$ to extract modulating signals (baseband signals) to convert the modulating signals into digital data.

Specifically, as illustrated in FIG. X, the X-axis processor 110, whose functions are substantially similar to the Y-axis processor 120, is operative to perform synchronous detection on the detection signal $v_{ox}$.

For example, the X-axis processor 110 turns on and off an analog switch 111 at a frequency equivalent to the carrier frequency $f_c$ and at proper timings; this analog switch 111 is provided in a signal path for the detection signal $v_{ox}$. As an example of the proper timings, the X-axis processor 110 turns on and off the analog switch 111 at the timings that allow only positive or negative half cycles of the detection signal $v_{ox}$ to pass therethrough.

Next, the X-axis processor 110 smoothes the output signal of the analog switch 111 using a low-pass filter 113 consisting of a resistor and a capacitor, thereby obtaining a direct current (DC) voltage.

In addition, the X-axis processor 110 is operative to convert the DC voltage into digital data using an analog-to-digital (A/D) converter 115, thereby obtaining the amplitude $A_X$ of the detection signal $v_{ox}$. Like the X-axis processor 110, the Y-axis processor 120 is operative to perform the synchronous detection on the detection signal $v_{oy}$ and the A/D conversion operation, thereby obtaining the amplitude $A_Y$ of the detection signal $v_{oy}$.

Note that various types of methods of demodulating the detection signals $v_{ox}$ and $v_{oy}$ are conventionally well known except for the synchronous detection set forth above, some examples of which are disclosed in the following nonpatent literatures:

M. H. Acuna, "Fluxgate magnetometers for outer planets exploration" IEEE Trans. Magn., Vol. 10, pp. 519-523, 1974;

Makoto Kawakami, Hazama Takeshi, "Small Size Magnetic Field Sensor", Technical Report of SUMITOMO TOKUSHU KINZOKU, Vol. 14, pp. 109-112, 2003;

X. Qianl, X. Lil, Y. P. Xu and j. Fanl, "Integrated driving and readout circuits for orthogonal fluxgate sensor" IEEE Trans. Magn., pp. 3715-3717, 2005; and I. Sasada, "Symmetric response obtained with an orthogonal fluxgate operating in fundamental mode" IEEE Trans. Magn., vol. 38, pp. 3377-3379, 2002.

Any of the various types of methods use analog detection circuits in order to demodulate the detection signals $v_{ox}$ and $v_{oy}$.

Specifically, the X and Y-axis processors 110 and 120 for performing demodulation on the detection signals $v_{ox}$ and $v_{oy}$ to extract original baseband signals and converting the extracted signals into digital data are designed to analog circuits.

This may make it difficult to integrate the analog circuits 110 and 120 together with the remaining elements of the signal-processing unit 100 in/on one chip, thereby preventing an apparatus designed to use such a fluxgate magnetometer from decreasing in size and manufacturing cost.

The analog X and Y-axis processors 110 and 120 consist of a large number of passive components that sensitively change in characteristics with time and with temperature. This may limit the accuracy of measurement of a target magnetic field and/or the reliability of an apparatus designed to use such a fluxgate magnetometer.

SUMMARY OF THE INVENTION

In view of the background, an object of at least one aspect of the present invention is to reduce an apparatus designed to use a fluxgate magnetometer in size and/or manufacturing cost.

According to one aspect of the present invention, there is provided a signal processing unit for processing a periodic detection signal output from a fluxgate magnetometer excited by a periodic excitation signal with a predetermined first frequency. The detection signal has a second frequency double of the predetermined first frequency and a magnitude of a magnetic field to be measured. The signal processing unit includes an integrating unit composed of a plurality of digital elements and operative to integrate the detection signal over every quarter of one cycle of the detection signal to generate an integration value. The integration values to be generated are represented as S1, S2, S3, S4, . . . . The signal processing unit includes a calculating unit composed of a plurality of digital elements and configured to perform addition and subtraction on the generated integration values in accordance with the following equations to calculate an in-phase component and a quadrature-phase component:

$$I_p = S_{4p-3} + S_{4p-2} - S_{4p-1} - S_{4p}$$

$$Q_p = S_{4p-3} - S_{4p-2} - S_{4p-1} + S_{4p}$$

where $I_p$ represents the in-phase component, $Q_p$ represents the quadrature-phase component, and p=1, 2, 3, . . . . The signal processing unit includes an amplitude obtaining unit configured to obtain an amplitude of the detection signal based on the obtained in-phase component and the quadrature-phase component.

According to another aspect of the present invention, there is provided a signal processing unit for processing a periodic detection signal output from a fluxgate magnetometer excited by a periodic excitation signal with a predetermined first frequency. The detection signal has a second frequency double of the predetermined first frequency and a magnitude of a magnetic field to be measured. The signal processing unit includes a first integrating unit composed of a plurality of digital elements and operative to integrate the detection signal over every half of one cycle of the detection signal to generate an integration value. The integration values to be generated are represented as S1, S2, S3, S4, . . . . The signal processing unit includes a regulating unit configured to regulate an operating timing of the integrating unit such that the generated integration values are maximized. The signal processing unit includes a subtracting unit composed of a plurality of digital elements and configured to perform addition and subtraction on the generated integration values in accordance with the following equations to calculate an in-phase component:

$$I_p = S_{2p-1} - S_{2p}$$

where $I_p$ represents the in-phase component, and p=1, 2, 3, . . . .

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
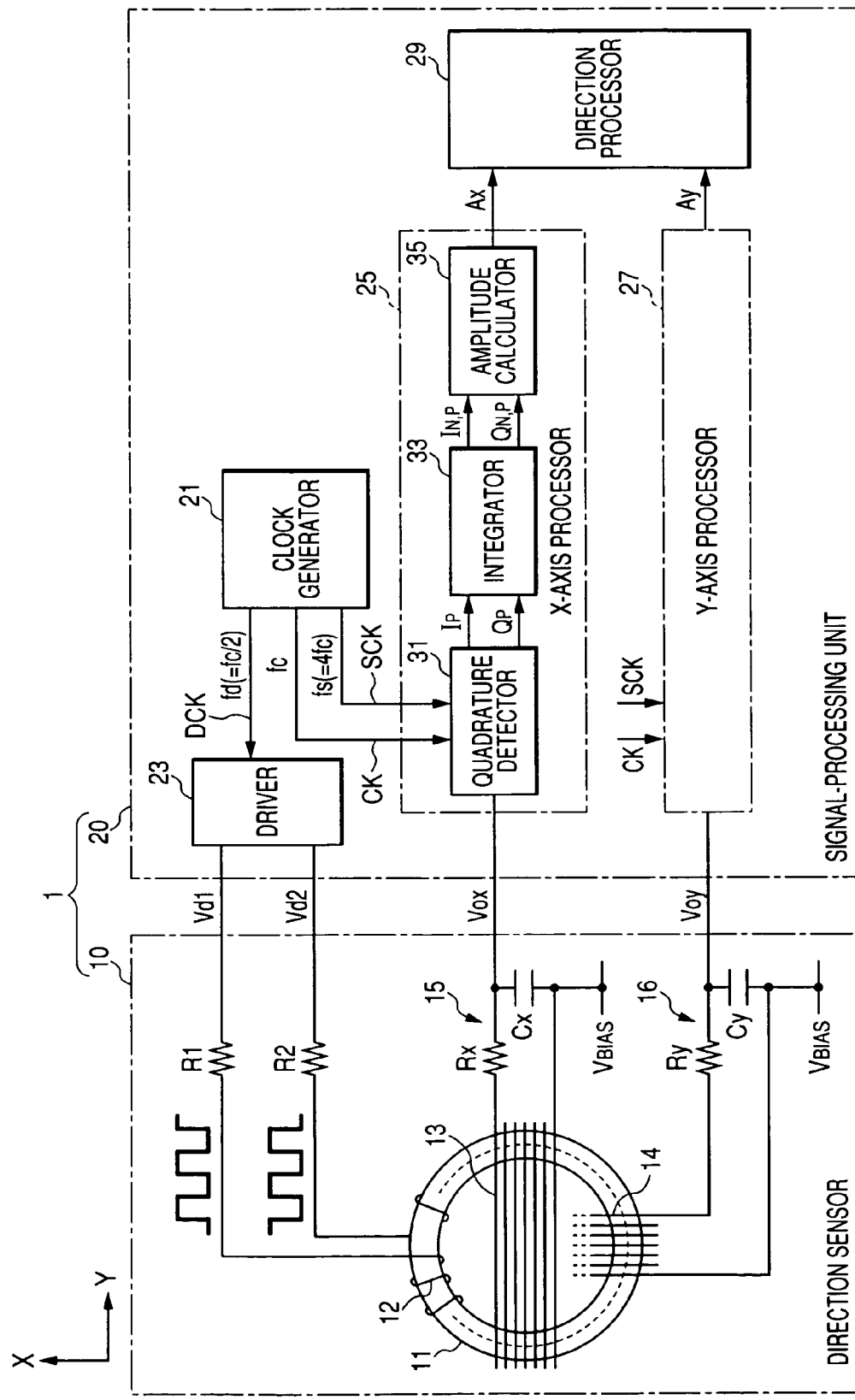
FIG. 1 is a block diagram schematically illustrating an example of the overall structure of a direction sensor according to a first embodiment to which the present invention is applied.

Referring to the drawings, in which like reference characters refer to like parts in several views, FIG. 1 illustrates an example of the overall structure of a direction sensor 1 according to a first embodiment to which the present invention is applied. The direction sensor 1 works to detect the earth's magnetic field as a target magnetic field, thereby obtaining information associated with directions based on the detected target magnetic field.

As illustrated in FIG. 1, the direction sensor 1 is composed of a fluxgate magnetometer 10 having two orthogonal sensing axes and a signal-processing unit 20 operative to drive the fluxgate magnetometer 10 and to process detection signals $v_{ox}$ and $v_{oy}$ output from the fluxgate magnetometer 10.

Because the elements of the fluxgate magnetometer 10 have been already described in the "Background of the invention" of this application, the descriptions of which will be omitted.

The signal-processing unit 20 according to the first embodiment is composed of:

a clock generator 21 operative to generate:
  a reference signal (clock signal) CK, which consists of a repetitive series of clock pulses, with a frequency (clock frequency) $f_c$, referred to as carrier frequency,
  a drive signal (a repetitive series of drive clock pulses) DCK with a frequency (drive frequency) $f_d$ that is half of the carrier frequency $f_c$ of the clock signal CK, in other words, the drive frequency $f_d$ is equivalent to $f_c/2$,
  a sampling signal (a repetitive series of sampling clock pulses) SCK with a frequency (sampling frequency) $f_s$ that is four times higher than the carrier frequency $f_c$ of the clock signal CK, in other words, the sampling frequency $f_s$ is equivalent to $4f_c$;

a driver 23 operative to generate, based on the drive signal DCK, excitation signals, such as excitation voltages, $v_{d1}$ and $v_{d2}$ respectively having complementary pulse waveforms and each having the drive frequency $f_d$ and to apply the generated excitation signals $v_{d1}$ and $v_{d2}$ to both ends of the drive control winding 12 via the resistors R1 and R2.

In the fluxgate magnetometer 10 having the drive control winding 12 to which the excitation signals $v_{d1}$ and $v_{d2}$ have been applied, the excitation signal application allows an alternating current with the drive frequency $f_d$ to flow through the drive control winding 12. The flow of the alternating current through the drive control winding 12 generates an alternating magnetic field with the drive frequency $f_d$ in the core 11 along the circumferential direction thereof.

When there is the target magnetic field, such as the earth's magnetic field with an X-axis component and a Y-axis component, the magnetic fields in the two portions of the core 11 at which the first sense winding 13 is wound are unbalanced. Similarly, the magnetic fields in the two portions of the core 11 at which the second sense winding 14 is wound are also unbalanced.

Because the magnetization curve of the core 11 has nonlinearity, the unbalance of the magnetic field in the core 11 causes a signal component to be induced in the first sense winding 13, this signal component has an amplitude proportional to the X-axis component of the target magnetic field and a frequency double of the drive frequency $f_d$. Specifically, the frequency of the signal component is equivalent to the carrier frequency $f_c$.

Similarly, the unbalance of the magnetic field in the core 11 causes a signal component to be induced in the second sense winding 14, this signal component has an amplitude proportional to the Y-axis component of the target magnetic field and a frequency double of the drive frequency $f_d$. Specifically, the frequency of the signal component is equivalent to the carrier frequency $f_c$.

The signal components each with carrier frequency $f_c$ are sampled by the filters (resonant circuits) 15 and 16 as the detection signals $v_{OX}$ and $v_{OY}$. The sampled detection signals $v_{ox}$ and $v_{oy}$ whose amplitudes represent the magnitudes of the X-axis and Y-axis components of the target magnetic field are supplied to the signal-processing unit 20.

In addition, the signal-processing unit 20 is composed of:
an X-axis processor 25 operative to generate, based on the detection signal $v_{ox}$ output from the first sense winding 13, amplitude data $A_x$ indicative of the amplitude of the detection signal $v_{ox}$;
a Y-axis processor 27 operative to generate, based on the detection signal $v_{oy}$ output from the second sense winding 14, amplitude data $A_y$ indicative of the amplitude of the detection signal $v_{oy}$; and a direction processor 29 operative to perform direction obtaining operation and/or magnetizing correction based on the amplitude data $A_x$ and the amplitude data $A_y$ respectively generated by the X and Y-axis processors 25 and 27.

The X-axis processor 25 includes a quadrature detector 31.

The quadrature detector 31 is operative to perform quadrature detection of the detection signal detection signal $v_{ox}$ in accordance with the clock signal CK and the sampling signal SCK to generate an in-phase component $I_p$ and a quadrature-phase component $Q_p$ of the detection signal $v_{ox}$ every carrier cycle ($T_c$), which can be described as "$1/f_c$" and is equivalent to one cycle of the clock signal CK, where p=1, 2, 3, ..., i.e. p represents the generation order of the in-phase and quadrature-phase components that have been sequentially generated based on respective carrier cycles.

The X-axis processor 25 also includes an integrator 33 operative to integrate:

each group of an N number of sequential in-phase components $I_p$ generated by the quadrature detector 31 to obtain an in-phase integration value $I_{N,P}$ (P=1, 2, 3, ... ); this N is an even number equal to or greater than 2, and each group of an N number of sequential quadrature-phase components $Q_p$ generated by the quadrature detector 31 to obtain a quadrature-phase integration value $Q_{N,P}$; this P represents a number of the groups).

The X-axis processor 25 further includes an amplitude calculator 35 operative to obtain the amplitude data $A_x$ based on the in-phase integration value $I_{N,P}$ and the quadrature-phase $Q_{N,P}$.

Note that the Y-axis processor 27 has substantially the same structure as the X-axis processor 25.

An example of the configuration of the X-axis processor 25 will be described in detail hereinafter. Note that, because the Y-axis processor 27 has substantially the same structure as the X-axis processor 25, the configuration of the Y-axis processor 27 will be omitted hereinafter.

The quadrature detector 31 is constructed by a plurality of CMOS digital elements, and designed to provide digital quadrature detection.

Figure 2:
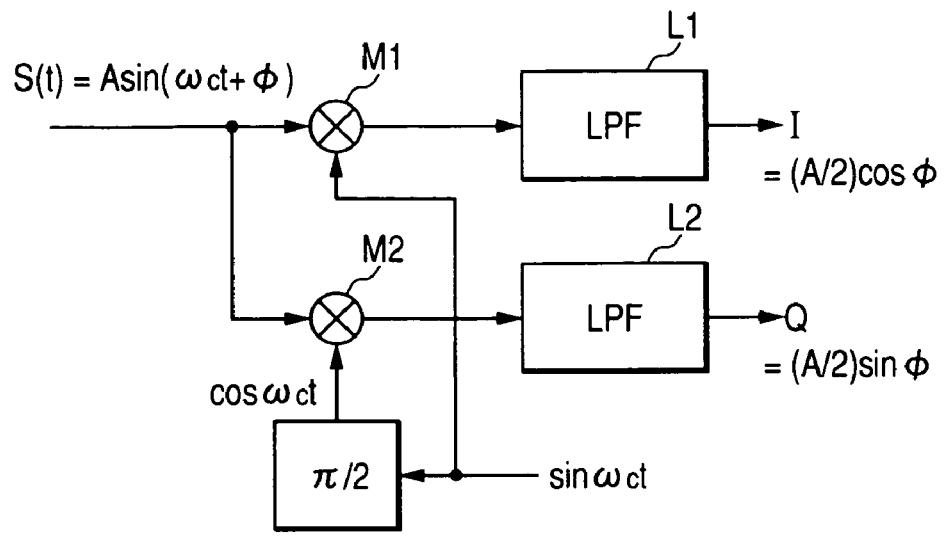
FIG. 2 is a circuit diagram schematically illustrating quadrature detection.

Quadrature detection is normally configured, as illustrated in FIG. 2 for an example, to:

a first multiplier M1 for multiplying a modulated carrier wave s(t) modulated by a baseband signal (target signal), which is represented as "$s(t)=A \sin(2\pi f_c t+\phi)$", by a sinusoidal wave ($\sin(2\pi f_c t)$);

a second multiplier M2 for multiplying the modulated carrier wave s(t) by a cosine wave ($\cos(2\pi f_c t)$) shifted in phase from the sinusoidal wave by $\pi/2$ (radian);

a first low pass filter (LPF) L1 for allowing a low-frequency component of the multiplied carrier wave sent from the first multiplier M1 to pass therethrough while restricting the higher-frequency component thereof to generate an in-phase component I ($=(A/2)\cos\phi$); and a second low pass filter L2 for allowing a low-frequency component of the multiplied carrier wave sent from the second multiplier M2 to pass therethrough while restricting the higher-frequency component thereof to generate a quadrature-phase component Q ($=(A/2)\sin\phi$), where $f_c$ is a carrier frequency of the carrier wave, A is an amplitude of a baseband signal (modulating signal), which is unknown, and $\phi$ is a phase of the baseband signal, which is unknown.

Figure 3:
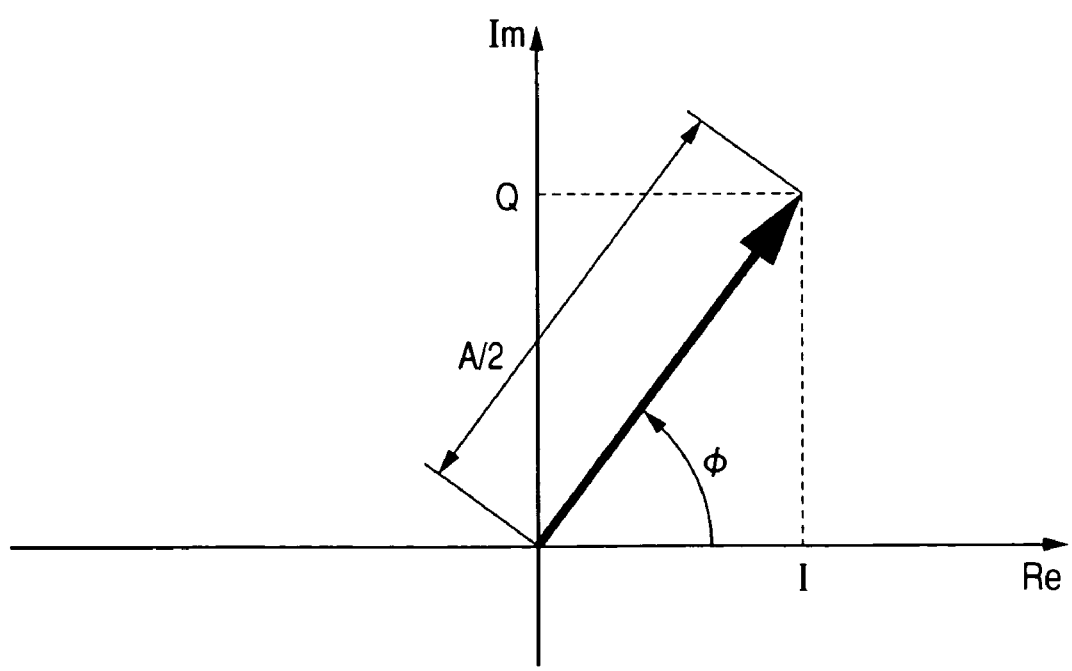
FIG. 3 is a graph schematically illustrating an in-phase component and a quadrature-phase component generated by the quadrature detection illustrated in FIG. 2.

The in-phase component I and the quadrature-phase component Q are shown on the rectangular coordinates illustrated in FIG. 3. Note that the horizontal axis (Re) represents the real part of a complex vector, and the vertical axis (Im) represents the imaginary part of the complex vector. Specifically, the in-phase component I represents the real part of the vector ($A/2+j\phi$) shown on the complex plane as the amplitude A and the phase $\phi$, and the quadrature-phase component Q represents the imaginary part of the vector ($A/2+j\phi$).

Thus, obtaining the in-phase component I and the quadrature-component Q of the modulated carrier wave s(t) allows the unknown amplitude A and the unknown phase $\phi$ of the baseband signal to be calculated.

As described above, the quadrature detection has been normally carried out using analog circuits.

In the embodiment, however, in place of the normal quadrature detection design set forth above, using the quadrature detector 31 permits the digital quadrature detection to be simply carried out.

Figure 4:
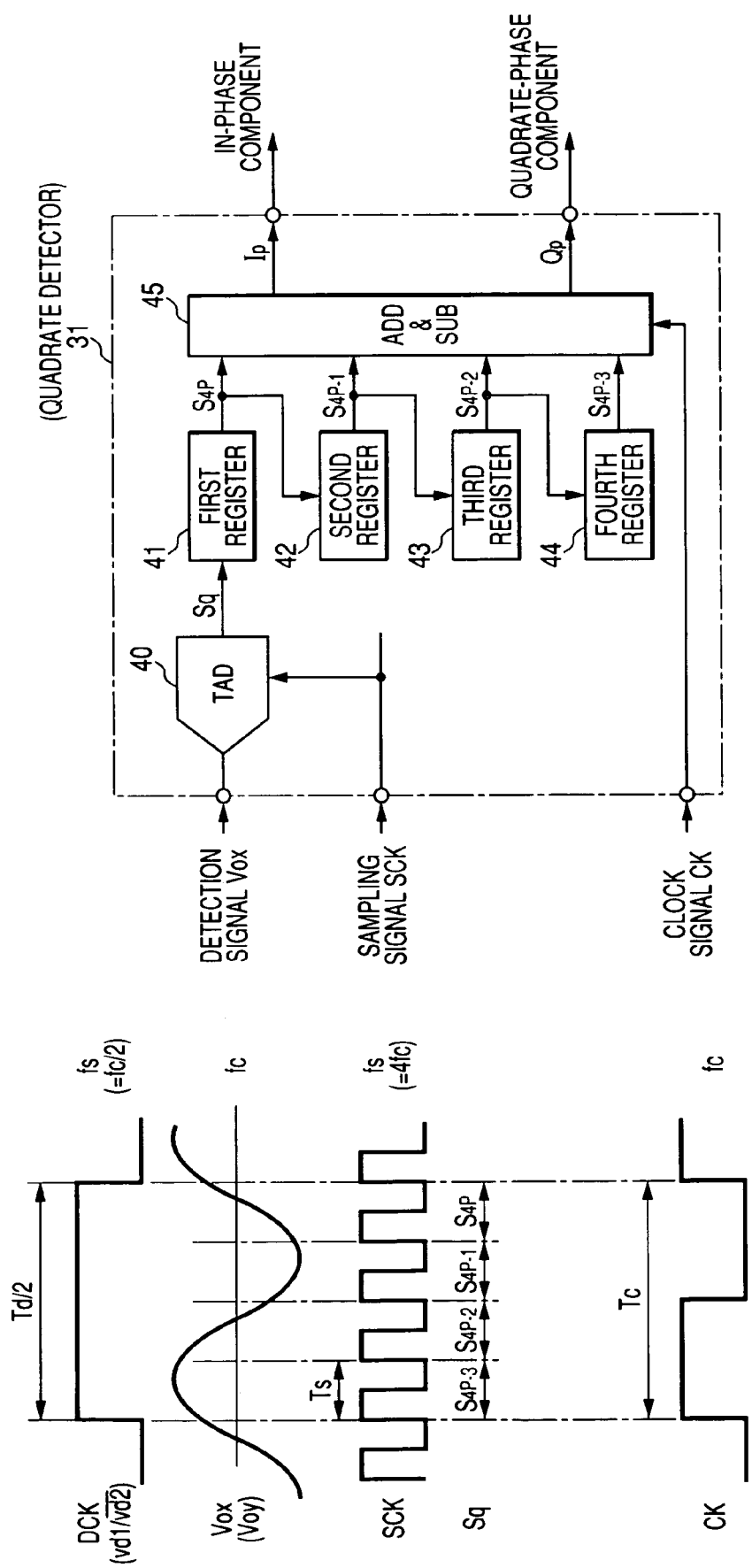
FIG. 4 is a block diagram schematically illustrating an example of the overall structure of a quadrature detector illustrated in FIG. 1.

Specifically, as illustrated in FIG. 4, the quadrature detector 31 is composed of a time analog to digital (A/D) converter 40 operative to average (integrate) the detection signal $v_{ox}$ over every sampling cycle $T_s$, thereby obtaining an average value (integration value) $S_q$ (q=1, 2, 3, ... , ) every sampling cycle $T_s$. The sampling cycle $T_s$ is equivalent to $1/f_s$ ($=1/4f_c=T_c/4$) and is equivalent to one cycle of the sampling signal SCK supplied from the clock generator 21. The time A/D converter will be referred to simply as "TAD" hereinafter.

The quadrature detector 31 is also composed of first to fourth registers 41 to 44 each with an input and an output, and an adder-subtractor 45. In FIG. 4, the adder-subtractor 45 is simply referred to as "ADD & SUB". The input of the first register 41 is connected to an output of the TAD 40, and the output thereof is connected to both the input of the second register 42 and the adder-subtractor 45. The output of the second register 42 is connected to both the adder-subtractor 45 and the input of the third register 43, and the output of the third register 43 is connected to both the adder-subtractor 45 and the input of the fourth register 44. The output of the fourth register 44 is connected to the adder-subtractor 45.

When an average value $S_{4p-3}$ is output from the TAD 40 in synchronization with one sampling clock pulse of the sampling signal SCK, the average signal $S_{4p-3}$ is input to the first register 41 to be latched therein. When the next average value $S_{4p-2}$ is output from the TAD 40 in synchronization with the next sampling clock pulse of the sampling signal SCK, the average value $S_{4p-3}$ latched in the first register 41 is shifted to the second register 42 to be latched therein, and the average value $S_{4p-2}$ is input to the first register 41 to be latched therein.

When the next average value $S_{4p-1}$ is output from the TAD 40 in synchronization with the next sampling clock pulse of the sampling signal SCK, the average value $S_{4p-3}$ latched in the second register 42 is shifted to the third register 43 to be latched therein, the average value $S_{4p-2}$ latched in the first register 41 is shifted to the second register 42 to be latched therein, and the average value $S_{4p-1}$ is input to the first register 41 to be latched therein.

When the next average value $S_{4p}$ is output from the TAD 40 upon application of the next sampling clock pulse of the sampling signal SCK, the average value $S_{4p-3}$ latched in the third register 43 is shifted to the fourth register 44 to be latched therein, the average value $S_{4p-2}$ latched in the second register 42 is shifted to the third register 43 to be latched therein, the average value $S_{4p-1}$ latched in the first register 41 is shifted to the second register 42 to be latched therein, and the average value $S_{4p}$ is input to the first register 41 to be latched therein.

The adder-subtractor 45 is operative to sample the integration values $S_{4p-3}$ to $S_{4p}$ and to perform addition and subtraction on the four sampled integration values $S_{4p-3}$ to $S_{4p}$.

Figure 5:
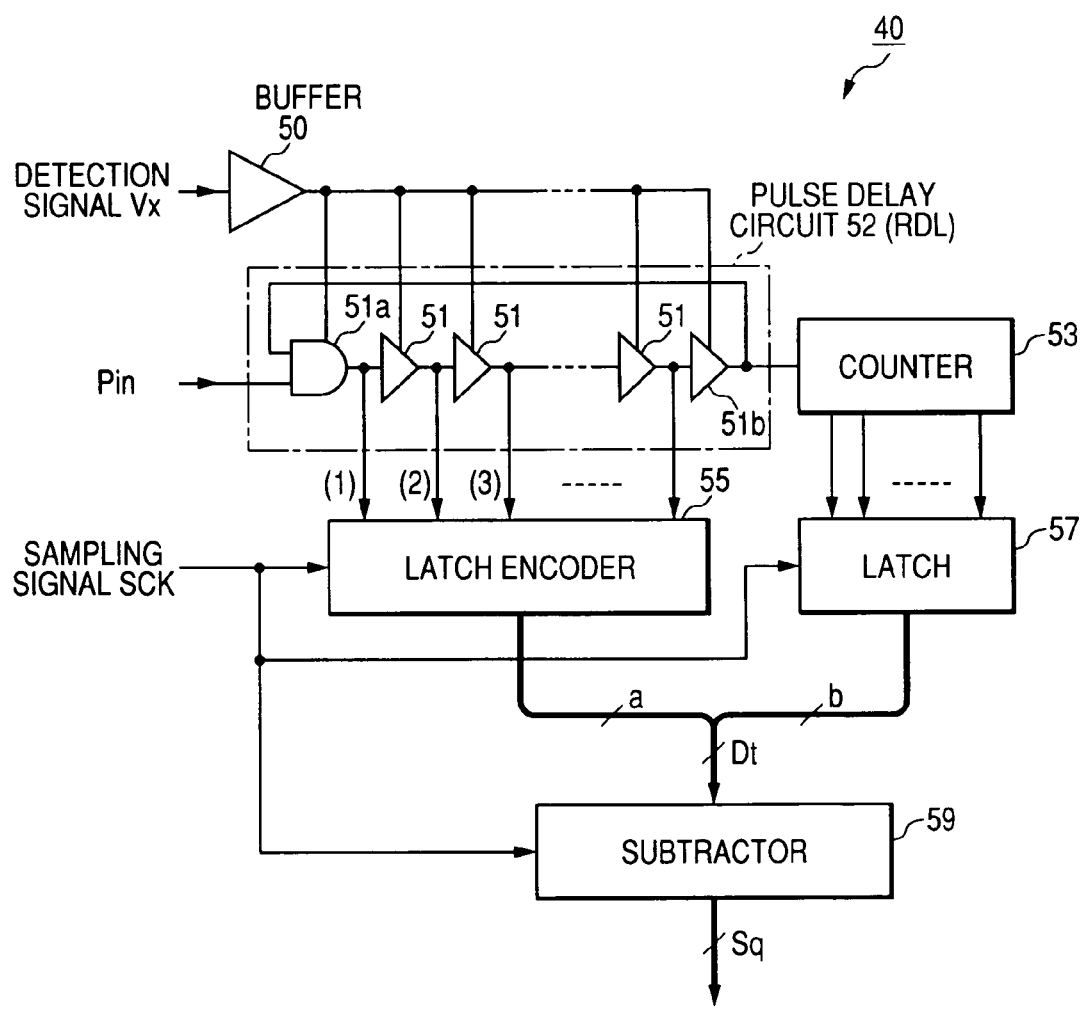
FIG. 5 is a block diagram schematically illustrating an example of the overall structure of a time analog to digital converter illustrated in FIG. 4.

The TAD 40 as illustrated in FIG. 5 includes a pulse delay circuit, in other words, a ring delay line (RDL) 52. The pulse delay circuit 52 is composed of a plurality of delay units 51 that corresponds to a plurality of stages of delay. The delay units 51 are serially connected to one another in a ring-like structure. Specifically, the first stage of the delay units 51 to which reference character "51a" is assigned is an AND gate having one and the other input terminals. A start pulse signal Pin is configured to be input to the one input terminal of the AND gate 51a. The other input terminal of the AND gate 51a is connected to an output terminal of the final stage 51b of the delay units 51.

When the pulse signal Pin is input to the AND gate 51a through its one input terminal, a pulse signal is sequentially transferred by the delay units 51 while being delayed thereby in the order from the AND gate 51a toward the final stage 51b of the delay units 51. When the pulse signal reaches the final stage 51b of the delay units 51, it is returned to the first stage 51a of the delay units 51 through it's the other input terminal. For this reason, the pulse signal is circulated through the delay units 51.

The TAD 40 includes a counter 53 connected to the output terminal of the final stage 51b of the delay units 51 and operative to count the number of times of circulation of the pulse signal through the circularly-connected delay units 51.

The TAD 40 includes a latch encoder 55 operative to:

latch a position where the pulse signal has reached at timing of a significant edge, such as leading edge (or trailing edge), of each sampling clock pulse of the sampling signal SCK; and convert the latched position of the pulse signal Pin into predetermined bits of digital data that represent what number of stage (delay unit 51) through which the pulse signal located at the latched position lastly passes from the first stage 51a.

The TAD 40 includes a latch 57 operative to:

latch the count value of the counter 53 at timing of a significant edge, such as leading edge (or trailing edge), of each sampling clock pulse of the sampling signal SCK; and convert the latched count value into predetermined bits of digital data.

The TAD 40 includes a subtractor 59. When the predetermined bits of digital data are input to the subtractor 59 from the latch encoder 55 as lower-order bits "b" of digital data Dt, and the predetermined bits of digital data are input thereto from the latch 57 as higher-order bits "a" of the digital data Dt, the subtractor 59 works to latch the input digital data Dt at timing of a significant edge, such as leading edge (or trailing edge), of each sampling clock pulse of the sampling signal SCK. The subtractor 59 also works to obtain the difference between the current latched input digital data Dt and the previous latched input digital data that has been latched one sampling clock pulse before the current latched input digital data Dt, thereby outputting the obtained difference as the average value (integration value) $S_q$.

Each of the delay units 51 constituting the pulse delay circuit 52 is composed of a gate circuit consisting of, for example, an inverter and/or other electronic logic gates.

The TAD 40 includes a buffer 50 to which the detection signal $v_{ox}$ is configured to be input. The detection signal $v_{ox}$ output from the amplifier 24 is configured to be applied to each of the delay units 51 as a power supply voltage.

The delay time of each delay unit 51 depends on the voltage level of the power supply voltage (the detection signal $v_{ox}$) supplied to each delay unit 51. Specifically, the delay time of each delay unit 51 is inversely proportional to the voltage level of the power supply voltage (the detection signal $v_{ox}$) supplied to each delay unit 51.

For this reason, the output of the subtractor 59, that is, data representing the number of delay units 51 through which the pulse signal passes within every sampling cycle $T_s$ is substantially proportional to the average value (integration value) $S_q$ obtained by averaging (integrating) the voltage level of the detection signal $v_{ox}$ over every sampling cycle $T_s$.

As set forth above, the TAD 40 has:

a first special characteristic of sequentially integrating the voltage level of the detection signal $v_{ox}$ without dead time; and a second special characteristic of performing digital processing including counting operation and digitally subtracting operation using CMOS digital elements.

The first special characteristic allows execution of the digital quadrature detection on the detection signal $v_{ox}$ set forth above, and the second special characteristic permits the quadrature detector 31 to be integrated together with the remaining elements of the X-axis signal processor 25 on/in one chip.

Note that such a TAD structure has been included in, for example, U.S. Patent Publications No. U.S. Pat. No. 6,771,202 B2. Because the U.S. patent is assigned to the same assignee as that of this application, disclosures of which are incorporated herein by reference.

The adder-subtractor 45 executes, in accordance with the following equations [1] and [2], addition and subtraction on each set of four average values $S_{4p-3}$ to $S_{4p}$ that have been sequentially output from the TAD 40 in synchronization with the sampling signal CK and sequentially latched in the first to fourth registers 41 to 44, thereby obtaining the in-phase component $I_p$ and the quadrature-phase component $Q_p$ of the detection signal $v_{ox}$:

$$I_p = S_{4p-3} + S_{4p-2} - S_{4p-1} - S_{4p} \qquad \text{[Equation 1]}$$

$$Q_p = S_{4p-3} - S_{4p-2} - S_{4p-1} + S_{4p} \qquad \text{[Equation 2]}$$

The adder-subtractor 45 repeats the addition and subtraction on the set of four average values $S^{4\ p-3}$ to $S_{4p}$ in accordance with the equations [1] and [2] every carrier cycle $T_s$.

Figure 6:
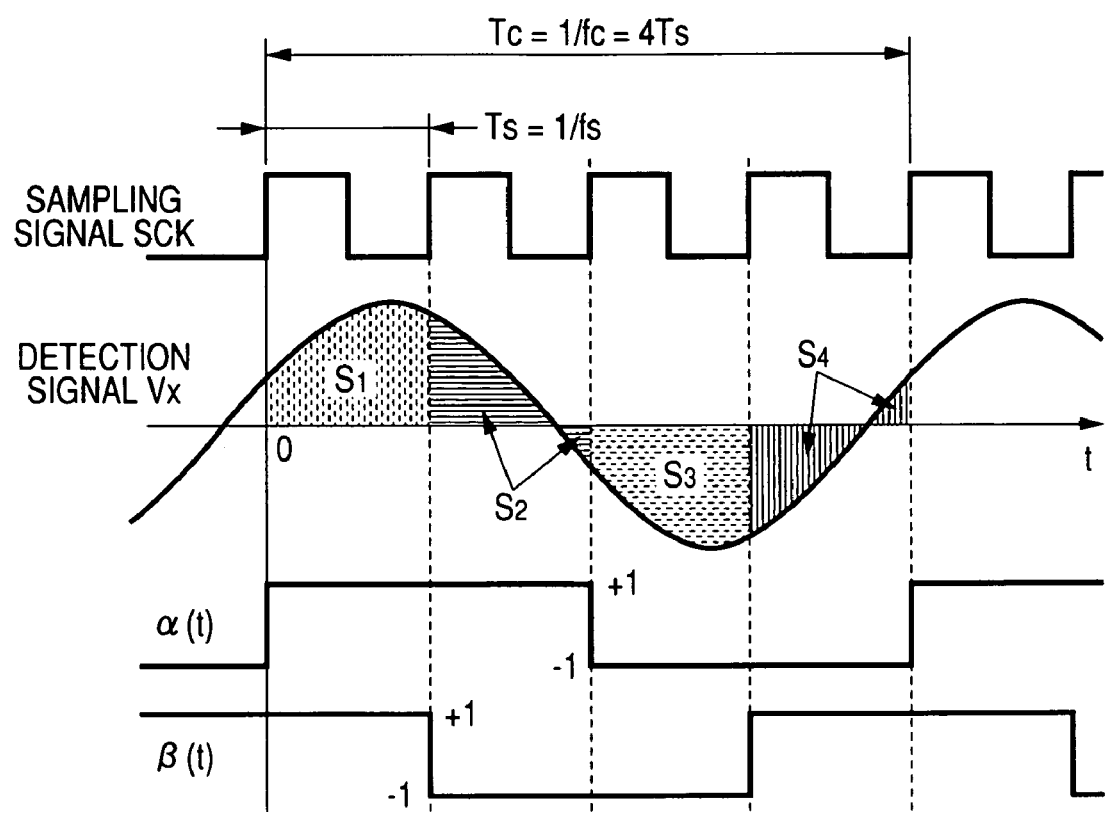
FIG. 6 is a timing chart schematically illustrating an example of digital quadrature detection executed by the quadrature detector illustrated in FIG. 5.

FIG. 6 schematically illustrates a timing chart of the digital quadrature detection executed by the quadrature detector 31.

Specifically, as illustrated in FIG. 6, the outputs $S_q$ (q=1, 2, 3, . . . ) of the TAD 40, which are synchronized with the respective same significant edges of the sampling clock pulses of the sampling signal SCK and appear every sampling cycle $T_s$, are proportional to the integration values of the detection signal $v_{ox}$ over respective sampling cycles $T_s$.

The operations in accordance with the equations [1] and [2] allow offset components contained in the $S_1$, $S_2$, $S_3$, . . . to be canceled from each other.

Specifically, the in-phase component $I_p$ obtained by the quadrature detector 31 in accordance with the equation [1] corresponds to the integration value obtained by integrating the product of the detection signal $v_{ox}$ and a square wave $\alpha(t)$ over one carrier cycle $T_c$; this square wave $\alpha(t)$ has the same frequency as the detection signal $v_{ox}$ and is synchronized with the sampling signal SCK (see FIG. 6).

Similarly, the quadrature-phase component $Q_p$ obtained by the quadrature detector 31 in accordance with the equation [2] corresponds to the integration value obtained by integrating the product of the detection signal $v_{ox}$ and a square wave $\beta(t)$ over one carrier cycle $T_c$; this square wave $\beta(t)$ has the same frequency as the detection signal $v_{ox}$ and is different in phase from the square wave $\alpha(t)$ by $\pi/2$ (radian) (see FIG. 6).

In other words, the multiplication between the detection signal $v_{ox}$ and the square wave $\alpha(t)$ and that between the detection signal $v_{ox}$ and the square wave $\beta(t)$ shifted in phase from the square wave $\alpha(t)$ by $\pi/2$ substantially correspond to the multiplication between the modulated carrier wave and the sinusoidal wave and that between the modulated carrier wave and the cosine wave shifted in phase from the sinusoidal wave by $\pi/2$ (radian), respectively.

Return to FIG. 1, the integrator 33 preferably has a modulo-N counter (not shown) capable of sequentially counting up from zero (initial value) until N−1 in synchronization with the significant edge, such as leading edge (or trailing edge) of each clock pulse of the clock signal CK and resetting its count value to zero in synchronization with the significant edge of the clock pulse after the count value has reached the N−1.

Specifically, the integrator 33 integrates individually the in-phase component $I_p$ and the quadrature-phase component $Q_p$ generated by the quadrature detector 31 every significant edge, such as leading edge (or trailing edge), of each clock pulse of the clock signal CK in accordance with the following equations [3] and [4], thereby obtaining the integration values $I_{N,P}$ and $Q_{N,P}$:

$$I_{N,P} = \sum_{p=(P-1)N+1}^{PN} I_p \quad \text{[Equation 3]}$$

$$Q_{N,P} = \sum_{p=(P-1)N+1}^{PN} Q_p \quad \text{[Equation 4]}$$

The integrator 33 supplies the obtained integration values $I_{N,P}$ and $Q_{N,P}$ to the amplitude calculator 35 in synchronization with each reset timing of the modulo-N counter.

Specifically, the integration value $I_{N,P}$ obtained by the integrator 33 in accordance with the equation [3] corresponds to the integration value obtained by integrating the in-phase component $I_p$, which is the product of the detection signal $v_{ox}$ and the square wave $\alpha(t)$, over every N number of carrier cycles $T_c$. Similarly, the integration value $Q_{N,P}$ obtained by the integrator 33 in accordance with the equation [4] corresponds to the integration value obtained by integrating the quadrature-phase component $Q_p$, which is the product of the detection signal $v_{ox}$ and the square wave $\beta(t)$, over every N number of carrier cycles $T_c$.

The integrating operations of the integrator 33 allow the in-phase integration value $I_{N,P}$ and the quadrature-phase integration value $Q_{N,P}$ of the detection signal $v_{ox}$ to be obtained without containing unnecessary signal components.

The amplitude calculator 35 is operative to calculate the amplitude data $A_x$ indicative of the amplitude of the detection signal $v_{ox}$ based on the in-phase integration value $I_{N,P}$ and the quadrature-phase integration value $Q_{N,P}$ in accordance with the following equation [5]:

$$A_x = \sqrt{I_{N,P}^2 + Q_{N,P}^2} \quad \text{[Equation 5]}$$

Because the direction obtaining operation and magnetizing correction to be executed by the direction processor 29 are well known, the descriptions of which will be omitted.

FIG. 7 is a graph schematically illustrating actual measurement values of the in-phase integration value $I_{N,P}$ and the quadrature-phase integration value $Q_{N,P}$ when the integration number N of the amplitude calculator 35 has been set to 2.

Figure 7B:
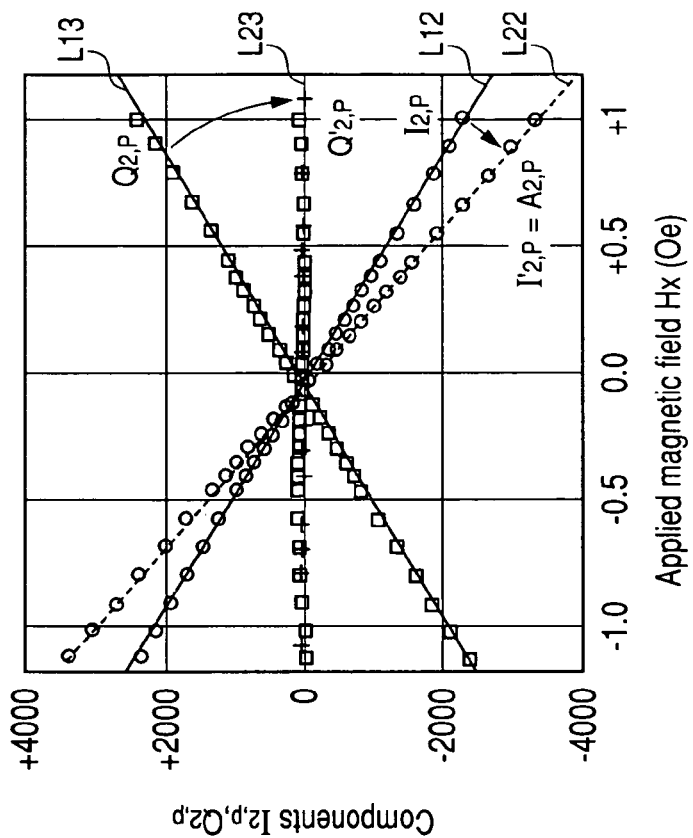
FIG. 7B is a graph schematically illustrating the components $I_{2,P}$ and $Q_{2,P}$ as functions of the target magnet field according to the first embodiment and a second embodiment of the present invention.
Figure 7A:
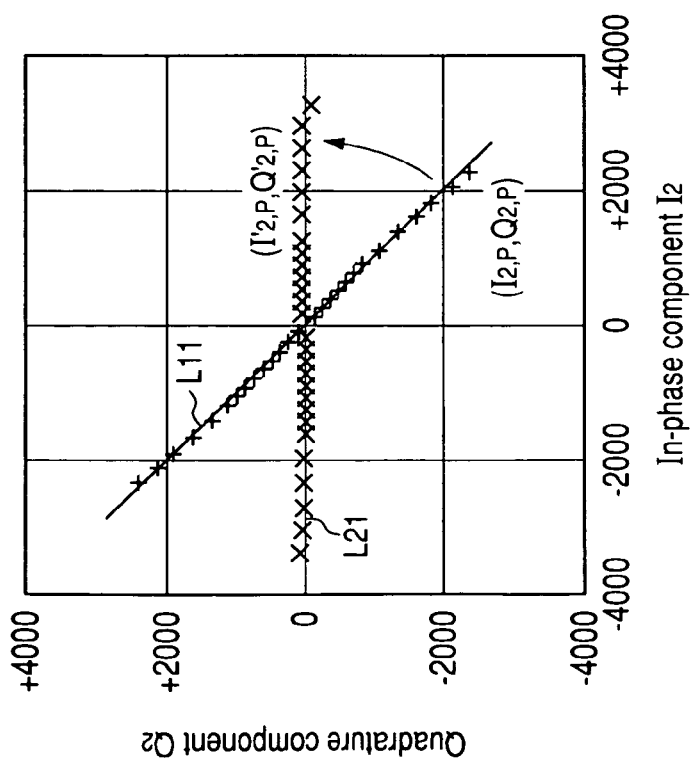
FIG. 7A is a graph on which loci of components of the vector $(I_{2,P}, Q_{2,P})$ are plotted based on a target magnetic field as a parameter according to the first embodiment and a second embodiment of the present invention.

Specifically, in FIG. 7A, components of the vector ($I_{2,P}$, $Q_{2,P}$) are plotted based on the target magnetic field $H_x$ as a parameter. The vector locus is shown on a regression line L11 passing through the original point. The gradient of the regression line L11 shows that the phase of the detection signal $v_{ox}$ is substantially $-\pi/4$.

FIG. 7B is a graph schematically illustrating the components $I_{2,P}$ and $Q_{2,P}$ as functions of the target magnet field $H_x$. The loci of the components $I_{2,P}$ and $Q_{2,P}$ are distributed on regression lines L12 and L13, respectively, which clearly shows that the components $I_{2,P}$ and $Q_{2,P}$ are proportional to the target magnetic field $H_x$.

Note that the measurement of the in-phase integration value $I_{N,P}$ and the quadrature-phase integration value $Q_{N,P}$ upon the integration number N of the amplitude calculator 35 being set to 2 has been repeated on condition that the target magnetic field is constant. The measurement result has shown that the components $I_{2,P}$ and $Q_{2,P}$ take substantially constant values without fluctuations, which would so that the reproducibility of the measurement result illustrated in FIGS. 7A and 7B is probably high.

As set forth above, in the direction sensor 1 according to the first embodiment, the X-axis processor 25 and Y-axis processor 27 are configured to perform the A/D conversion and demodulation of the detection signals $v_{ox}$ and $v_{oy}$ with the use of the quadrature detector 31 consisting of the TAD 40.

Specifically, the operations of the TAD 40, the addition and subtraction operations, the integration operations, and the operations for obtaining the amplitude Ax can be easily digitized using digital elements, such as CMOS digital elements. This allows at least the X and Y-axis processors 25 and 27 and the direction processor 29 to be integrated together on/in one chip, and therefore, all of the components of the signal-processing unit 20 to be integrated together on/in one chip. This makes it possible to downsize the direction sensor 1 and reduce the manufacturing cost thereof.

The direction sensor 1 according to the first embodiment is designed to obtain the amplitude data $A_x$ and $A_y$ of the detection signals $v_{ox}$ and $v_{oy}$ based on the in-phase integration value $I_{N,P}$ and the quadrature-phase integration value $Q_{N,P}$; these in-phase and quadrature phase integration values $I_{N,P}$ and $Q_{N,P}$ are calculated by integrating each group of an N number of sequential in-phase components $I_p$ and each group of an N number of sequential quadrature-phase components $Q_p$, respectively.

The integration of each group of an N number of sequential in-phase components $I_p$ and each group of an N number of sequential quadrature-phase components $Q_p$ is functionally equivalent to limit pass bandwidths of unwanted signal components. This bandwidth limit feature has been described in U.S. patent application Ser. No. 10/926,286. Because the U.S. patent application is assigned to the same assignee as that of this application, disclosures of which are incorporated herein by reference.

For this reason, the more the integration number N increases, the more components without the detection target components, such as the components with the carrier frequency $f_c$ are eliminated from the in-phase integration value $I_{N,P}$ and the quadrature-phase integration value $Q_{N,P}$.

Especially, this makes it possible to reliably eliminate noise components having a frequency range (notch frequency range) that is an integral multiple of the $f_c/N$ (=$2f_d/N$).

Second Embodiment

Figure 8:
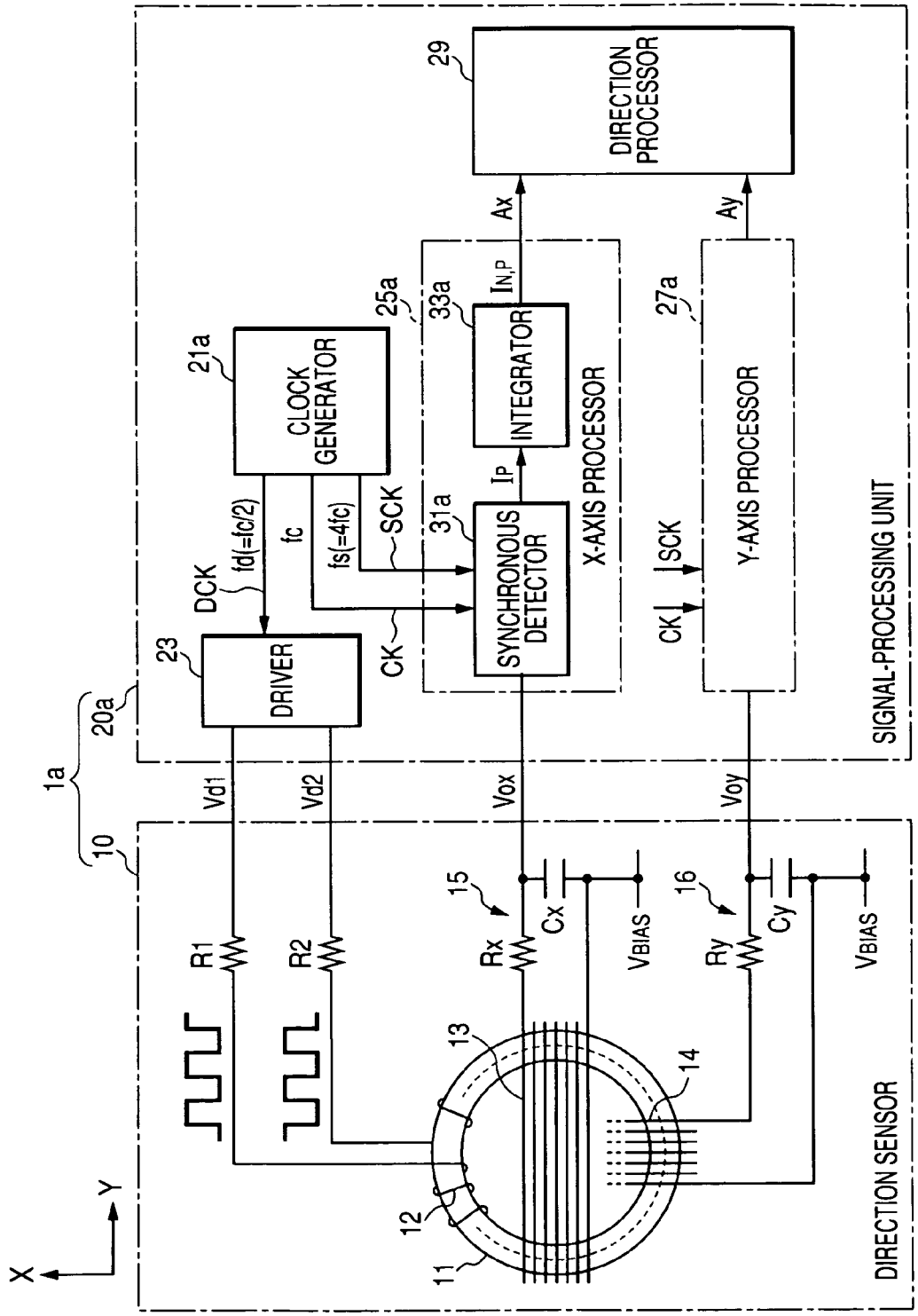
FIG. 8 is a block diagram schematically illustrating an example of the overall structure of a direction sensor according to the second embodiment to which the present invention is applied.

FIG. 8 illustrates an example of the overall structure of a direction sensor 1a according to a second embodiment to which the present invention is applied.

Note that the configuration of the direction sensor 1a is substantially identical with that of the direction sensor 1 according to the first embodiment except for part of a signal-processing unit 20a. For this reason, like reference characters are assigned to like parts in the direction sensors 1 and 1a according to the first and second embodiments so that descriptions of the parts will be omitted, and the different part will be mainly described.

As illustrated in FIG. 8, a clock generator 21a of the signal-processing unit 20a is operative to generate, in addition to the clock signal CK and the drive signal DCK, a sampling signal (a repetitive series of sampling clock pulses) SCK1 with a sampling frequency $f_s$ that is two times higher than the carrier frequency $f_c$ of the clock signal CK, in other words, the sampling frequency $f_s$ is equivalent to $2f_c$.

An X-axis processor 25a of the signal-processing unit 20a includes a synchronous detector 31a.

The synchronous detector 31a is operative to perform quadrature detection of the detection signal detection signal $v_{ox}$ in accordance with the clock signal CK and the sampling signal SCK to generate an in-phase component $I_p$ and a quadrature-phase component $Q_p$ of the detection signal $v_{ox}$ every carrier cycle ($T_c$), which can be described as "$1/f_c$" and is equivalent to one cycle of the clock signal CK, where p=1, 2, 3, . . . , i.e. p represents the generation order of the in-phase and quadrature-phase components that have been sequentially generated based on respective carrier cycles.

The X-axis processor 25a also includes an integrator 33a operative to integrate:

each group of an N number of sequential in-phase components $I_p$ generated by the synchronous detector 31 to obtain an in-phase integration value $I_{N,P}$ (P=1, 2, 3, . . . ); this N is an even number equal to or greater than 2, and each group of an N number of sequential quadrature-phase components $Q_p$ generated by the synchronous detector 31a to obtain a quadrature-phase integration value $Q_{N,P}$; this P represents a number of the groups).

The X-axis processor 25a further includes an amplitude calculator 35a operative to obtain the amplitude data $A_x$ based on the in-phase integration value $I_{N,P}$ and the quadrature-phase $Q_{N,P}$.

Note that the Y-axis processor 27a has substantially the same structure as the X-axis processor 25a.

Figure 9:
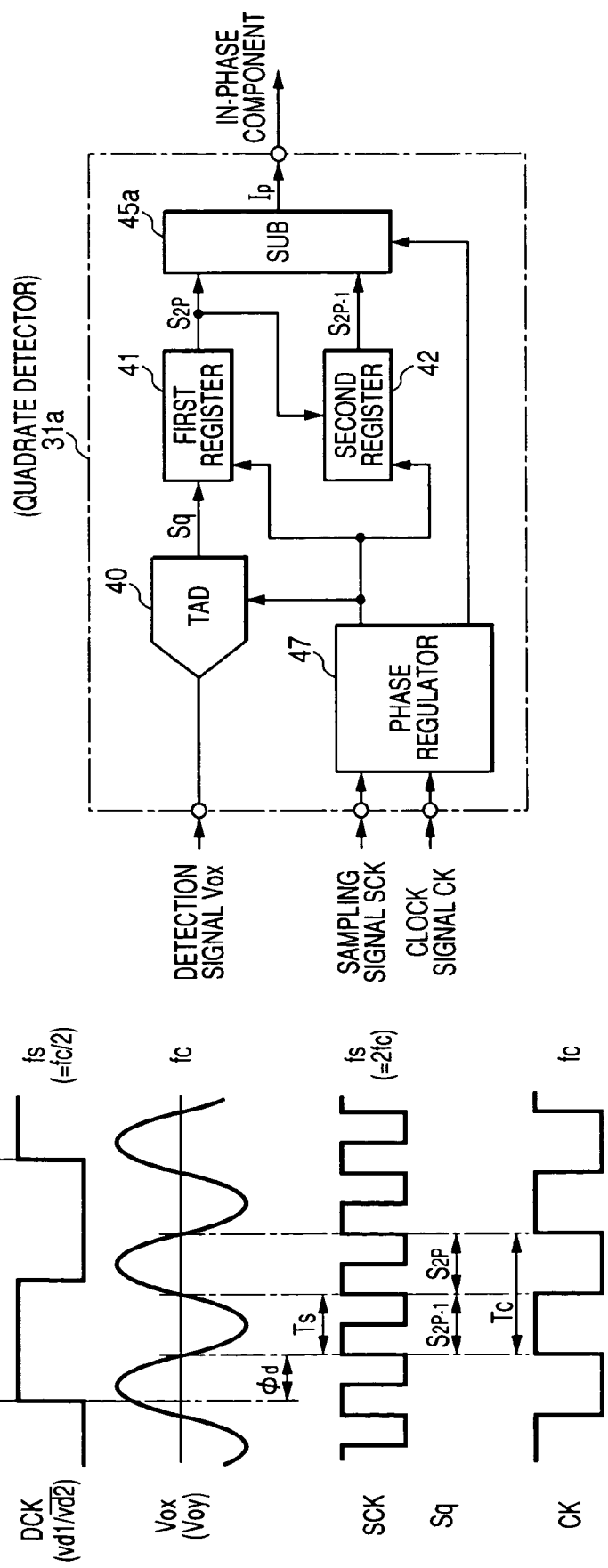
FIG. 9 is a block diagram schematically illustrating an example of the overall structure of a quadrature detector illustrated in FIG. 8.
Figure 10:
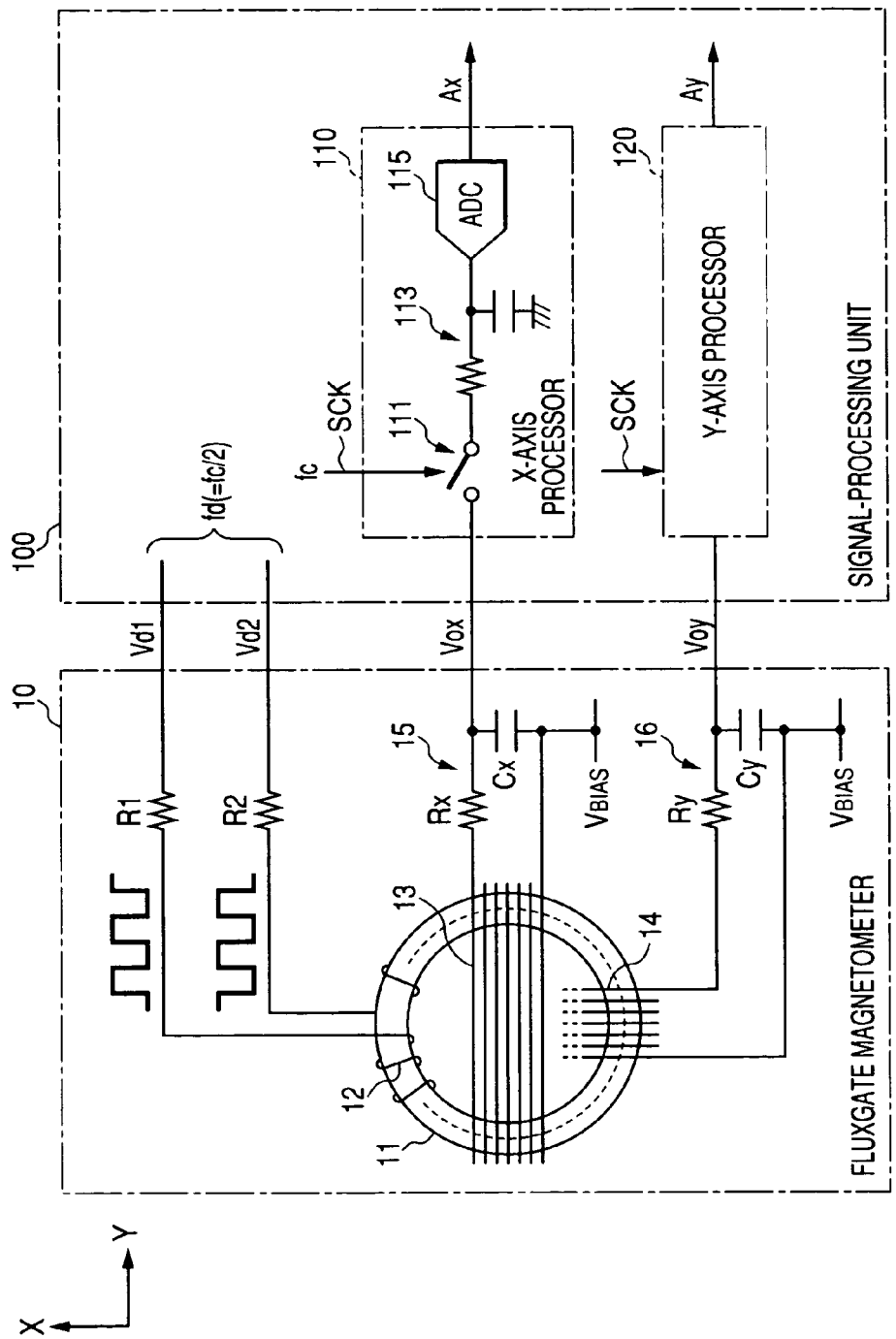
FIG. 10 is a block diagram schematically illustrating an example of the overall structure of a fluxgate magnetometer.
Figure 11:
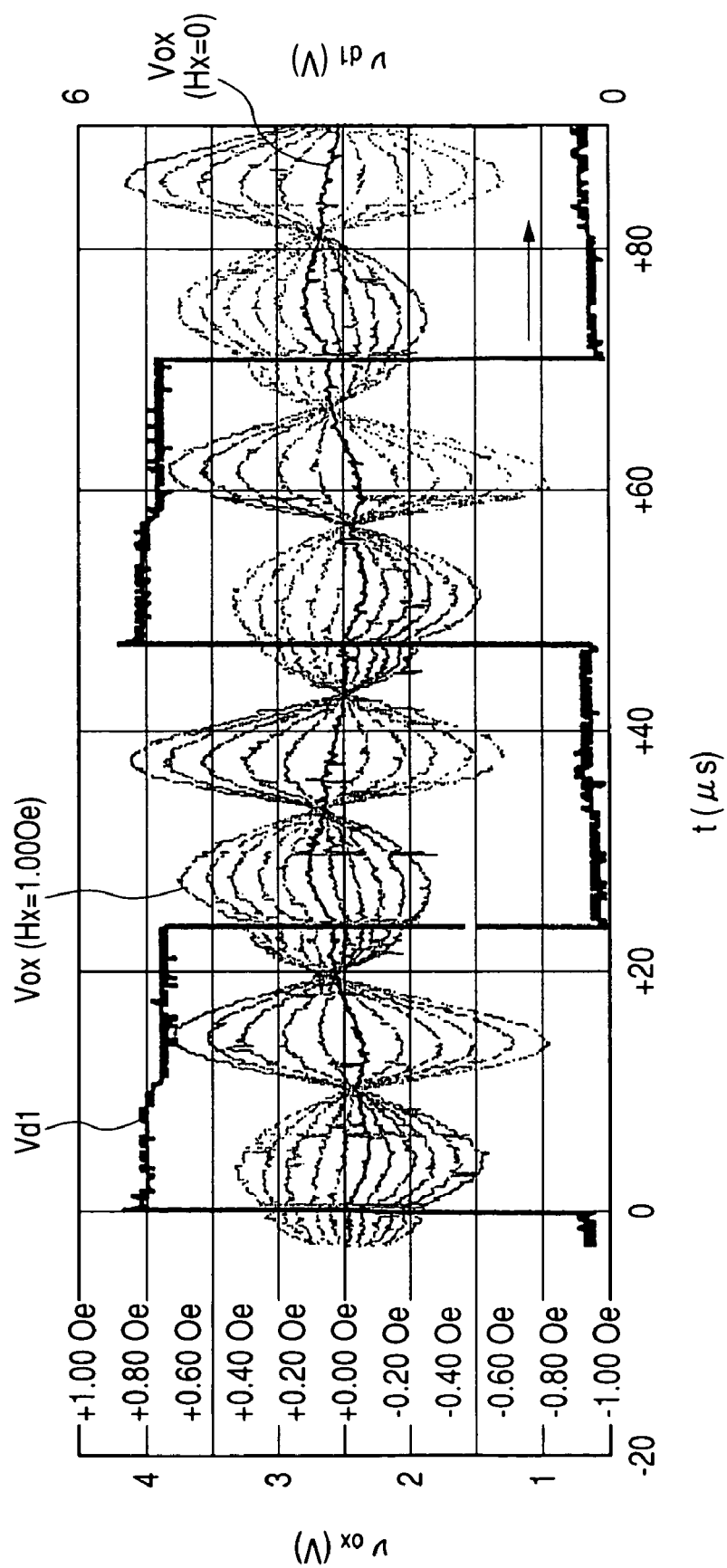
FIG. 11 is a graph schematically illustrating waveforms of an excitation signal and a detection signal sensed by a first sense winding of a fluxgate magnetometer.

As illustrated in FIG. 9, the synchronous detector 31a is composed of a phase regulator 47 operative to regulate the phase of the clock signal CK and that of the sampling signal CSK.

The synchronous detector 31a is also composed of a time A/D converter (TAD) 40 operative to average (integrate) the detection signal $v_{ox}$ over every sampling cycle $T_s$ of the sampling signal SCK whose phase is regulated, thereby obtaining an average value (integration value) $S_q$ (q=1, 2, 3, . . . , ) every sampling cycle $T_s$. The sampling cycle $T_s$ is equivalent to $1/f_s$ (=$1/2f_c$=$T_c/2$) and is equivalent to one cycle of the sampling signal SCK whose phase is regulated by the phase regulator 47.

The synchronous detector 31a is also composed of first and second registers 41 and 42 each with an input and an output, and a subtractor 45a. The input of the first register 41 is connected to an output of the TAD 40, and the output thereof is connected to both the input of the second register 42 and the subtractor 45a. The output of the second register 42 is connected to the subtractor 45a.

When an average value $S_{2p-1}$ is output from the TAD 40 in synchronization with one sampling clock pulse of the sampling signal SCK, the average signal $S_{2p-1}$ is input to the first register 41 to be latched therein. When the next average value $S_{2p}$ is output from the TAD 40 in synchronization with the next sampling clock pulse of the sampling signal SCK, the average value $S_{2p-1}$ latched in the first register 41 is shifted to the second register 42 to be latched therein, and the average value $S_{2p}$ is input to the first register 41 to be latched therein.

When the next average value $S_{4p-1}$ is output from the TAD 40 in synchronization with the next sampling clock pulse of the sampling signal SCK, the average value $S_{4p-3}$ latched in the second register 42 is shifted to the third register 43 to be latched therein, the average value $S_{4p-2}$ latched in the first register 41 is shifted to the second register 42 to be latched therein, and the average value $S_{4p-1}$ is input to the first register 41 to be latched therein.

The subtractor 45a is operative to sample the integration values $S_{2p-1}$ and $S_{2p}$ and to perform subtraction on the two sampled integration values $S_{2p-1}$ and $S_{2p}$ in accordance with the following equation [6], thereby obtaining an in-phase component $I_p$ of the detection signal $v_{ox}$:

$$I_p = S_{2p-1} - S_{2p} \qquad \text{[Equation 6]}$$

The phase regulator 47 is operative to appropriately delay in phase at least one of the clock signal CK and the sampling signal SCK to set each of the integration values $S_{2p-1}$ and $S_{2p}$ and therefore the amplitude data $A_x$ to the corresponding maximum value. The delay time in phase (phase regulation) will be referred to as $\phi_d$.

According to the synchronous detector 31a with the structure set forth above, the integration values $S_{2p-1}$ and $S_{2p}$ are obtained every carrier cycle $T_c$ of the clock signal CK so that one in-phase component $I_p$ is obtained based on the integration values $S_{2p-1}$ and $S_{2p}$.

Return to FIG. 8, the integrator 33a is operative to integrate the in-phase component $I_p$ generated by the synchronous detector 31a in accordance with the equations [3], thereby obtaining the integration values $I_{N,P}$, such as the amplitude data $A_x$.

The integrating operations of the integrator 33a allow the in-phase integration value $I_{N,P}$, such as the amplitude data $A_x$ of the detection signal $v_{ox}$ to be obtained without containing unnecessary signal components, such as noise components having a frequency that is the same as the drive frequency $f_d$ of the drive signal DCK.

The phase regulation of the phase regulator 47 is equivalent to, in FIG. 7, shift the vector locus of the components ($I_{2,P}$, $Q_{2,P}$) distributed on the regression line L11 to a vector locus distributed on a regression line L21. In other words, the phase regulation of the phase regulator 47 is equivalent to cause the quadrature-phase components $Q_p$, and therefore the quadrature-phase integration value $Q_{2,P}$ to be substantially zero independently of the target magnetic field so that the in-phase components $I_p$, and therefore the in-phase integration value $I'_{2,P}$ represent the amplitude of the detection signal $v_{ox}$. Specifically, set of the delay time $\phi_d$ in phase to $-\pi/4$ allows the in-phase integration value $I'_{2,P}$ to serve as the amplitude of the detection signal $v_{ox}$.

In other words, the sampling timing in synchronization with each pulse of the sampling clock signal SCK is shifted in phase to each pulse of the clock signal CK, which permits the quadrature-phase components $Q_p$ to be independent of the target magnetic field.

In addition, the phase regulation of the phase regulator 47 is equivalent to, in FIG. 7B, shift the locus of the in-phase components $I_{2,P}$ distributed on the regression line L12 to be distributed on a regression line L22, and that of the quadrature-phase components $Q_{2,P}$ distributed on the regression line L13 to be distributed on a regression line L23.

As described above, in the direction sensor 1a according to the second embodiment, the X-axis processor 25a and Y-axis processor 27a are configured to perform the A/D conversion and demodulation of the detection signals $v_{ox}$ and $v_{oy}$ with the use of the synchronous detector 31a consisting of the TAD 40.

The direction sensor 1a according to the second embodiment is designed to obtain the amplitude data $A_x$ and $A_y$ of the detection signals $v_{ox}$ and $v_{oy}$ based on the in-phase integration value $I_{N,P}$ and the quadrature-phase integration value $Q_{N,P}$; these in-phase and quadrature phase integration values $I_{N,P}$ and $Q_{N,P}$ are calculated by integrating each group of an N number of sequential in-phase components $I_p$ and each group of an N number of sequential quadrature-phase components $Q_p$, respectively.

Thus, the direction sensor 1a according to the second embodiment has the same effects as those obtained by the direction sensor 1 according to the first embodiment.

Especially, in the direction sensor 1a according to the second embodiment, the sampling signal SCK and the clock signal CK are regulated in phase such that the in-phase components $I_p$ generated by the synchronous detector 31a serve as amplitude data $A_x$ and $A_y$. This permits components required to perform: the quadrature-phase component generation, integration, and amplitude-data calculation to be omitted, as compared with the direction sensor 1 according to the first embodiment. This makes it possible to simplify the structure of the signal-processing unit 20, and therefore the direction sensor 1.

Note that each of the in-phase component $I_p$ and the quadrature-phase component $Q_p$ of each of the detection signals $v_{ox}$ and $v_{oy}$ proportionally depends on the target magnetic field $H_x$. For this reason, use of any one of the in-phase component $I_p$ and the quadrature-phase component $Q_p$ of each of the detection signals $v_{ox}$ and $v_{oy}$ permits the amplitude data thereof. Phase regulation of the clock signal CSK and the sampling clock signal SCK allows one of the in-phase component $I_p$ and the quadrature-phase component $Q_p$ of each of the detection signals $v_{ox}$ and $v_{oy}$ to be zero such that the other to serve as the amplitude data of each of the detection signals $v_{ox}$ and $v_{oy}$. This makes it possible to increase the sensitivity of the integrator 33a upon detection of the amplitude data using one of the in-phase component $I_p$ and the quadrature-phase component $Q_p$.

In each of the first and second embodiments, the clock generator 21 generates the clock signal CK and the sampling signal SCK, but the clock signal CK and the sampling signal SCK can be individually generated. In this modification, lock of the phase obtained by the quadrature detector allows the frequency of the sampling clock signal SCK to be accurately four times higher than the frequency of the clock signal CK.

In the second embodiment, the phase regulator 47 is configured to delay in phase at least one of the clock signal CK and the sampling signal SCK to regulate the difference therebetween in phase, but the present invention is not limited to the structure.

Specifically, if the clock generator 21 divides, in frequency, a signal, which is periodically oscillating positively and negatively in time according to a frequency higher than that of the sampling frequency, thereby generating the clock signal CK and/or the sampling signal SCK, the clock generator 21 can shift the timing of the frequency division to regulate the signal in phase.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A signal processing unit for processing a periodic detection signal output from a fluxgate magnetometer excited by a periodic excitation signal with a predetermined first frequency, the detection signal having a second frequency double of the predetermined first frequency and a magnitude of a magnetic field to be measured, the signal processing unit comprising:

an integrating unit composed of a plurality of digital elements and operative to integrate the detection signal over every quarter of one cycle of the detection signal to generate an integration value, the integration values to be generated being represented as S1, S2, S3, S4, . . . ;

a calculating unit composed of a plurality of digital elements and configured to perform addition and subtraction on the generated integration values in accordance with the following equations to calculate an in-phase component and a quadrature-phase component:

$$I_p = S_{4p-3} + S_{4p-2} - S_{4p-1} - S_{4p}$$

$$Q_p = S_{4p-3} - S_{4p-2} - S_{4p-1} + S_{4p}$$

where $I_p$ represents the in-phase component, $Q_p$ represents the quadrature-phase component, and p=1, 2, 3, . . . ; and an amplitude obtaining unit configured to obtain an amplitude of the detection signal based on the obtained in-phase component and the quadrature-phase component.

2. A signal processing unit according to claim 1, wherein the integrating unit comprises:

a pulse delay circuit composed of a plurality of delay units serially connected to one another to form a plurality of stages of delay such that the detection signal is supplied to each of the delay units, when a pulse is input to the plurality of delay units, the plurality of delay units sequentially transferring a pulse signal while delaying it, a delay time of the pulse signal by each of the delay units depending on a level of the detection signal supplied thereto; and a counter unit configured to count what number of stages through which the pulse signal passes at timing of each quarter of one cycle of the detection signal, thereby obtaining the count value as the integration value.

3. A signal processing unit according to claim 2, wherein the amplitude obtaining unit is configured to:
   integrate each group of an N number of the in-phase components calculated by the calculating unit at respective cycles of the detection signal to obtain an in-phase integration value;
   integrate each group of an N number of the quadrature-phase components calculated by the calculating unit at respective cycles of the detection signal to obtain a quadrature-phase integration value, the N being integer equal to or greater than 2; and
   calculate the amplitude of the detection signal based on the in-phase integration value and the quadrature-phase integration value.

4. A signal processing unit for processing a periodic detection signal output from a fluxgate magnetometer excited by a periodic excitation signal with a predetermined first frequency, the detection signal having a second frequency double of the predetermined first frequency and a magnitude of a magnetic field to be measured, the signal processing unit comprising:
   a first integrating unit composed of a plurality of digital elements and operative to integrate the detection signal over every half of one cycle of the detection signal to generate an integration value, the integration values to be generated being represented as S1, S2, S3, S4, . . . ;
   a regulating unit configured to regulate an operating timing of the integrating unit such that the generated integration values are maximized; and
   a subtracting unit composed of a plurality of digital elements and configured to perform addition and subtraction on the generated integration values in accordance with the following equations to calculate an in-phase component:

$$I_p = S_{2p-1} - S_{2p}$$

where $I_p$ represents the in-phase component, and p=1, 2, 3, . . . .

5. A signal processing unit according to claim 4, wherein the integrating unit comprises:
   a pulse delay circuit composed of a plurality of delay units serially connected to one another to form a plurality of stages of delay such that the detection signal is supplied to each of the delay units, when a pulse is input to the plurality of delay units, the plurality of delay units sequentially transferring a pulse signal while delaying it, a delay time of the pulse signal by each of the delay units depending on a level of the detection signal supplied thereto; and
   a counter unit configured to count what number of stages through which the pulse signal passes at timing of each half of one cycle of the detection signal, thereby obtaining the count value as the integration value.

6. A signal processing unit according to claim 5, further comprising:
   a second integrating unit configured to integrate each group of a plurality of the in-phase components calculated by the subtracting unit at respective cycles of the detection signal to obtain an in-phase integration value, thereby obtaining an amplitude of the detection signal as the in-phase integration value.

* * * * *